(12) United States Patent
Hung et al.

(10) Patent No.: US 8,610,679 B2
(45) Date of Patent: Dec. 17, 2013

(54) TOUCH SENSING DISPLAY DEVICE

(75) Inventors: Yi-ling Hung, Longtan Township (TW); Heng-chang Lin, Longtan Township (TW); Chiu-lin Su, Yangmei Township (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 934 days.

(21) Appl. No.: 12/748,436

(22) Filed: Mar. 28, 2010

(65) Prior Publication Data

US 2011/0141035 A1    Jun. 16, 2011

(30) Foreign Application Priority Data

Dec. 10, 2009  (TW) ............................... 98223157 U (51) Int. Cl.
   *G06F 3/041*     (2006.01)
   *G02F 1/1339*    (2006.01)

(52) U.S. Cl.
   USPC .......................................... 345/173; 349/155

(58) Field of Classification Search
   None
   See application file for complete search history.

(56) References Cited

U.S. PATENT DOCUMENTS

| | | | |
|---|---|---|---|
| 2009/0174650 A1* | 7/2009 | Choi et al. | 345/104 |
| 2010/0097548 A1* | 4/2010 | Koito et al. | 349/113 |
| 2010/0156819 A1* | 6/2010 | Takahashi et al. | 345/173 |

OTHER PUBLICATIONS

G. J. A. Destura, J. T. M. Osenga, S. J. Van Der Hoef and A. D. Pearson, "Novel Touch Sensitive In-Cell AMLCD", SID Symposium Digest, 2004, pp. 22-23, Philips Research, The Netherlands and United Kingdom.

Bong Hyun You, Byoung Jun Lee, Ki-Chan Lee, Sang Youn Han, Jae Hyun Koh, Jae Hoon Lee, Seiki Takahashi, Brian H. Berkeley, Nam Deog Kim and Sang Soo Kim, "12.1-inch a-Si:H TFT LCD with Embedded Touch Screen Panel", SID Symposium Digest, 2008, pp. 830-833, Samsung Electronics, Korea.

* cited by examiner

*Primary Examiner* — Charles V. Hicks
*Assistant Examiner* — Kirk Hermann
(74) *Attorney, Agent, or Firm* — Cheng-Ju Chiang (57) ABSTRACT

A touch sensing display device includes a first substrate; a second substrate parallel to the first substrate, a plurality of scanning lines and sensing lines being disposed on the second substrate, and the scanning lines being interlaced with the sensing lines; a plurality of touch switches disposed on the second substrate, each touch switch being connected between one scanning line and one sensing line in series; and a plurality of spacers disposed on the first substrate corresponding to the touch switches, respectively, each spacer having a conductive layer disposed on a bottom side facing to the corresponding touch switch, and having isolating surfaces on the other sides, wherein each touch switch has a turned-on state and a turned-off state, and the conductive layer of the spacer corresponding thereto causes said touch switch to be changed from the turned-off state to the turned-on state when a touch event is received.

9 Claims, 9 Drawing Sheets

TOUCH SENSING DISPLAY DEVICE

TECHNICAL FIELD OF THE INVENTION

The present invention relates to a display device, and more particularly, to a touch sensing display device.

BACKGROUND OF THE INVENTION

A touch sensing display device is a display device that receives a user's input commands via a touch panel having a function of sensing touches. Generally, an adhesive material is utilized to assemble the touch panel and display device as the touch sensing display device. Nowadays, a technique for directly disposing sensors on the display device to detect a touch event has been developed. The display device utilizing this technique is called an embedded touch sensing display device.

Figure 1:
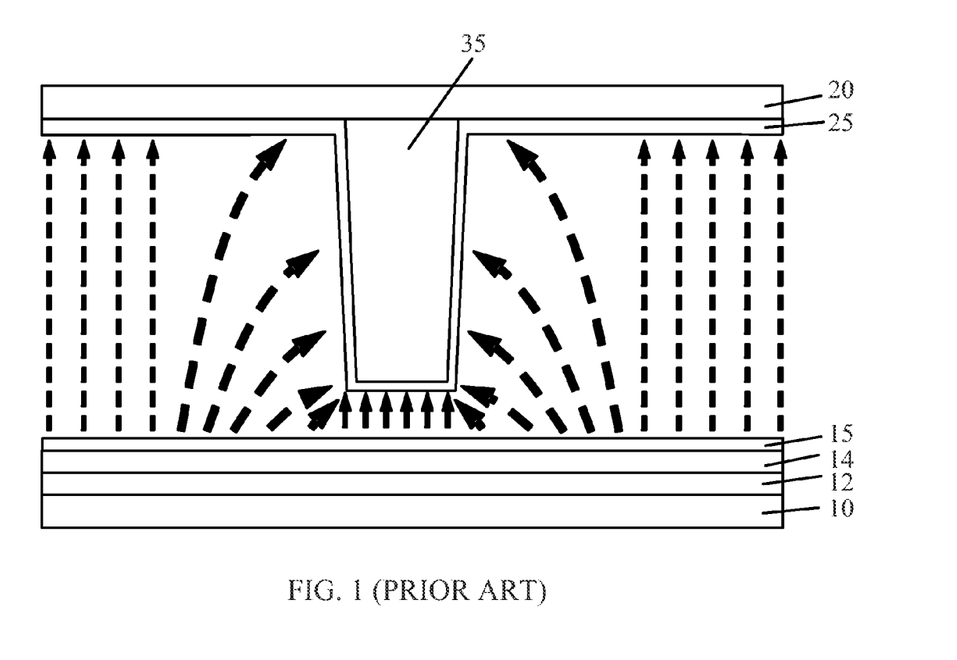
FIG. 1 is a diagram showing a cross-sectional view of a structure of a conventional touch sensing display device.

Please refer to FIG. 1, which is a diagram showing a cross-sectional view of a structure of a conventional touch sensing display device. The conventional touch sensing display device is a liquid crystal display (LCD) device disposed with touch sensors. The LCD panel includes a thin-film transistor (TFT) array substrate 10, a color filter (CF) substrate 20, and a liquid crystal layer (not shown) disposed therebetween. A dielectric layer 12 and a passivation layer 14 are disposed on the TFT array substrate 10. Indium tin oxide (ITO) layers 15, 25 are respectively disposed on the TFT array substrate 10 and the CF substrate 20 for serving as a pixel electrode and a common electrode to orient liquid crystal molecules.

A spacer 35 is disposed on the CF substrate 20. The spacer 35 is covered by the ITO layer 25, which is used as the common electrode. When a user touches the panel at a position where the spacer 35 is located, the spacer 35 moves downward so that the ITO layer 25 under the spacer 35 touches the ITO layer 15 on the TFT array substrate 10. At this moment, the ITO layers 15, 25 contact to be shorted with each other. The ITO layer 15 is a resistive film. When the ITO layers 15, 25 at different positions of the panel contact to be shorted with each other, different voltages will be detected. Therefore, a two-dimensional coordinate of a touch point can be determined according to the detected voltage.

Figure 2A:
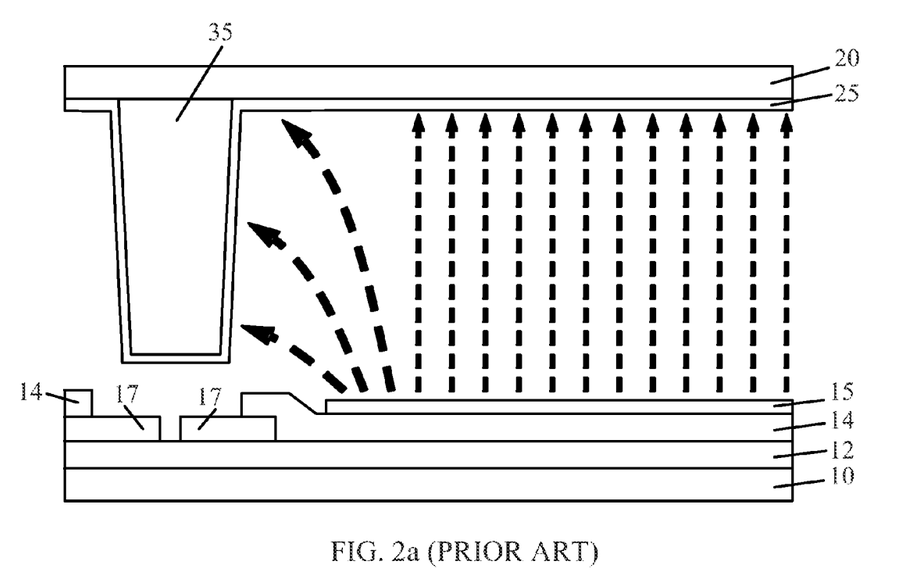
FIG. 2a is a diagram showing a cross-sectional view of a structure of another conventional touch sensing display device.

Please refer to FIG. 2a, which is a diagram showing a cross-sectional view of a structure of another conventional touch sensing display device. The same components are indicated by the same reference numbers as in FIG. 1. As shown in FIG. 2a, two separate metal pads 17 are disposed on a TFT array substrate 10. The two metal pads 17 are disposed in correspondence to a spacer 35 on a CF substrate 20 as shown. When a user touches the panel at a position where the spacer 35 is located, the ITO layer 25 under the spacer 35 contacts both the two metal pads 17, and thus electrically connecting the two metal pads 17. The voltage at the ITO layer 25 serving as a common electrode is thereby transmitted to the metal pads 17.

Figure 2B:
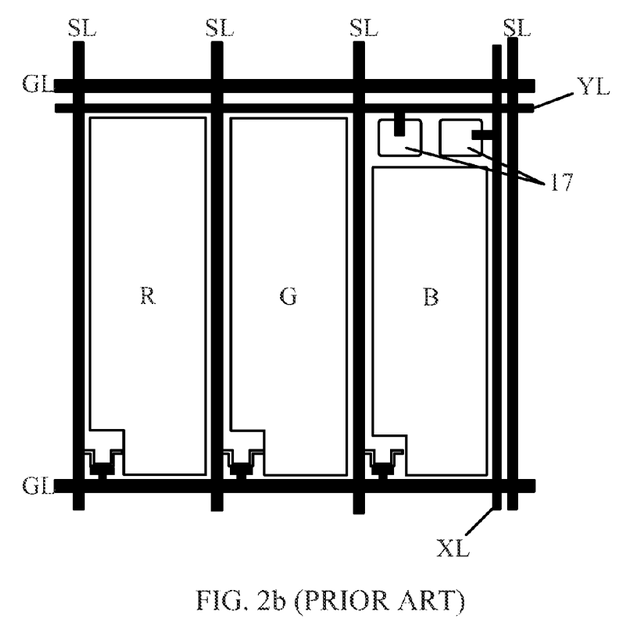

Please refer to FIG. 2b, showing a layout of the conventional touch sensing display device in FIG. 2a. As shown in FIG. 2b, an X independent sensing line (XL) parallel to a source line (SL) and a Y independent sensing line (YL) parallel to a gate line (GL) are disposed on the display panel. The gate line (GL) transmits a scan signal to control a thin-film transistor, and the source line (SL) transmits pixel data. The X independent sensing line (XL) and Y independent sensing line (YL) are respectively connected to the two metal pads 17. When the ITO layer 25 contacts the two metal pads 17, the voltage of the ITO layer 25 is transmitted to the X independent sensing line (XL) and Y independent sensing line (YL). The two-dimensional coordinate of a touch point can be determined according to a voltage variation of the X sensing line (XL) and a voltage variation of the Y sensing line (YL) on the display panel.

In each of the two conventional touch sensing display devices mentioned above, the voltage of the common electrode will be affected, and this leads to an unstable problem of displaying images. In addition, the lateral or peripheral side of the spacer 35 is covered by the ITO layer 25. This will cause a fringing electric field phenomenon so that the image displaying quality is degraded. Moreover, parasitic capacitances will be generated among the X sensing line (XL), Y sensing line (YL), gate line (GL), and source line (SL). The image displaying may be abnormal when the parasitic capacitances are considerable.

SUMMARY OF THE INVENTION

An objective of the present invention is to provide a touch sensing display device for solving a problem of fringing electric field caused between a common electrode and a pixel electrode. The fringing electric field phenomenon may affect image displaying quality.

Another objective of the present invention is to provide a touch sensing display device for solving an unstable problem of displaying images. This problem is resulted from the common electrode of which the voltage is interfered.

An objective of the present invention is to provide a touch sensing display device for reducing the manufacturing cost.

According to the above objectives, the present invention provides a touch sensing display device including: a first substrate; a second substrate parallel to the first substrate, a plurality of scanning lines and a plurality of sensing lines being disposed on the second substrate, and the scanning lines being interlaced with the sensing lines; a plurality of touch switches disposed on the second substrate, each touch switch being connected between one of the scanning lines and one of the sensing lines in series; and a plurality of spacers disposed on the first substrate corresponding to the touch switches, respectively, each spacer having a conductive layer disposed on a bottom side facing to the corresponding touch switch, and having isolating surfaces on the other sides, wherein each touch switch has a turned-on state and a turned-off state, and the conductive layer of the spacer corresponding thereto causes said touch switch to be changed from the turned-off state to the turned-on state when a touch event is received.

In another aspect, the present invention provides a touch sensing display device including: a plurality of scanning lines and a plurality of sensing lines disposed on a substrate, the scanning lines being interlaced with the sensing lines; and a plurality of touch switches and a plurality of switch elements, each touch switch and each switch element being connected between one of the scanning lines and one of the sensing lines in series for controlling electrical connection between said scanning line and said sensing line, wherein each touch switch has a turned-on state and a turned-off state, and said touch switch is on the turned-on state when a touch event is received, and wherein each switch element operates according to a scan signal, and said switch element is turned on when receiving the scan signal; wherein when said touch switch receives the touch event and said switch element receives the scan signal, said touch switch and said switch element are turned on so that said scanning line and said sensing line connected to said touch switch and said switch element are electrically connected, and a voltage of the scan signal on said scanning line is superimposed to said sensing line.

The present invention has advantages as listed below. (1) The conductive layer is only disposed on the bottom side of the spacer. There is no conductive material disposed on the lateral or peripheral side of the spacer. Therefore, the present invention can solve the problem of fringing electric field. (2) The voltage of the common electrode on the display panel has not been interfered or disturbed. Therefore, the present invention does not lead to an unstable problem of displaying images since the voltage of the common electrode is not drifted or varied. (3) The original gate lines and source lines in the panel are utilized for determining the coordinate of a touch point. There is no need to dispose other additional sensing lines. Therefore, the manufacturing cost is reduced. (4) The switch elements disposed between the gate lines and source lines are served as current switches. When the gate lines are not scanned, the corresponding switch elements are turned off. Therefore, since the corresponding switch elements are turned off, the voltage of the corresponding source lines will not be affected even though touch events occur thereon. Therefore, images on the screen can be updated normally.

BRIEF DESCRIPTION OF THE DRAWINGS

The present invention will be described in details in conjunction with the appending drawings.

FIG. 2b is a diagram showing a layout of the conventional touch sensing display device in FIG. 2a.

FIG. 4b shows a top view of the components in the touch sensing display device in FIG. 4a.

FIG. 7b shows a top view of the components in the touch sensing display device in FIG. 7a.

DETAILED DESCRIPTION OF THE INVENTION

Figure 3:
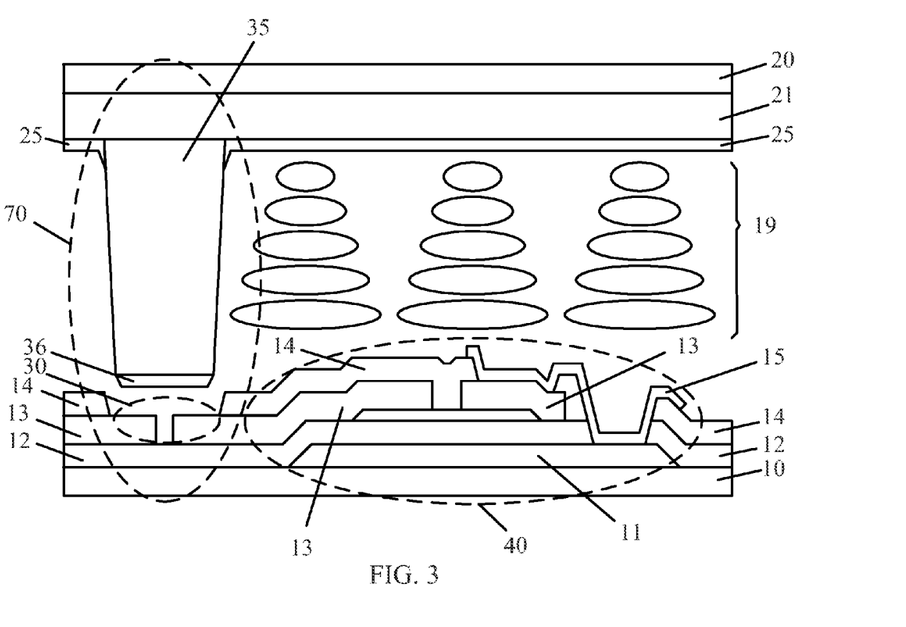
FIG. 3 is a diagram showing a cross-sectional view of a structure of a touch sensing display device of the present invention.

Please refer to FIG. 3, which is a diagram showing a cross-sectional view of a structure of a touch sensing display device of the present invention. The touch sensing display device mainly has a mechanical switch 70 and a switch element 40 both disposed on each pixel area of the display panel. The mechanical switch 70 is utilized for detecting whether a touch event occurs on the pixel area. The switch element 40 is a current switch. The function of the switch element 40 in the entire touch control circuit will be described later.

As shown in FIG. 3, it shows an example in which the mechanical switch 70 and switch element 40 are disposed in a liquid crystal display (LCD) panel. The LCD panel includes a thin-film transistor (TFT) array substrate 10, a color filter (CF) substrate 20, and a liquid crystal layer 19 disposed therebetween. A black matrix (BM) 21 is disposed on the CF substrate 20 for concealing the light. As shown in FIG. 3, the mechanical switch 70 mainly includes a spacer 35, a conductive layer 36, and a touch switch 30. The spacer 35 is an isolator disposed on the CF substrate 20. The touch switch 30 has two separate metal pads disposed on the TFT array substrate 10. The conductive layer 36 is disposed on a bottom side of the spacer 35 and is disposed facing to the two metal pads of the touch switch 30. The conductive layer 36 and the metal pads are separated with an appropriate distance. When the mechanical switch 70 receives a touch event which may be done by a hand, fingertip, or other objects, a displacement of the spacer 35 is generated under the strain (e.g. a downward pressed force). This displacement causes the conductive layer 36 to contact both the two metal pads, and thus the two metal pads are electrically connected. At this moment, the touch switch 30 is turned on. When the spacer 35 is released or no more undergoes the force, the spacer 35 moves back to the original position. The conductive layer 36 and the metal pads are separated. At this moment, the touch switch is turned off.

In the present invention, the conductive layer 36 is only disposed on the bottom side of the spacer 35. There is no conductive material disposed on the lateral or peripheral side of the spacer 35. Therefore, the conductive layer 36 will not affect an electric field distribution when the liquid crystal molecules are oriented by the electric field for displaying images. The present invention can solve the problem of fringing electric field, and thus improving the image quality of the LCD panel.

Generally, an indium tin oxide (ITO) layer 25 is disposed on the CF substrate 20 for serving as a common electrode of the LCD panel. The pixel electrode on the TFT array substrate 10 is also an ITO film. A parallel electric field is generated between the pixel electrode and the common electrode to orient liquid crystal molecules. In the present invention, a position of a touch point is not determined according to a voltage variation of the common electrode. The voltage of the common electrode is not interfered or disturbed. Therefore, the present invention does not lead to an unstable problem of displaying images since the voltage of the common electrode is not drifted or varied. The operation principle of the present invention to determine a position of a touch point will be described later.

In the present invention, the switch element 40 is a current switch. The switch element 40 may be implemented by a diode, or preferably, a metal oxide semiconductor (MOS) diode. As shown in FIG. 3, the switch element 40 is a MOS diode that is implemented by a metal oxide semiconductor field effect transistor (MOSFET) in which a gate and a source (or drain) are connected. As shown in FIG. 3, the MOSFET on the TFT array substrate 10 includes a first metal layer 11, a dielectric layer 12, a second metal layer 13, and a passivation layer 14. The gate of the MOSFET is formed by the first metal layer 11 which can be aluminum (Al) or other conductive materials. The source and drain of MOSFET is formed by the second metal layer 13 which can be composite metal materials such as Mo/Al/Mo, or other single or composite conductive materials. The dielectric layer 12 is formed between the first metal layer 11 and the second metal layer 13. The dielectric layer 12 can be silicon nitride or silicon oxide. The passivation layer 14 is for protecting the MOSFET. The passivation layer 14 can be silicon nitride, silicon oxide, organic layer, or other dielectric materials.

As shown in FIG. 3, an indium tin oxide (ITO) layer 15 is utilized as a conductor to electrically connect the gate and source (or drain) of the MOSFET. After the gate and source (or drain) are electrically connected, the MOSFET operates as a diode, which is able to conduct an electric current in only one direction. The MOSFET having the gate and source (or drain) thereof connected together is called a MOS diode. The ITO layer 15 may be formed by patterning an ITO film in the process of manufacturing the pixel diode of display panel.

In addition, the touch switch 30 and the switch element 40 on the TFT array substrate 10 are connected in series. As shown in FIG. 3, one metal pad of the touch switch 30 is connected to the drain (or source) of the MOS diode. The two metal pads of the touch switch 30 may be formed in manufacturing the second metal layer 13.

The operation principle to determine a position of a touch point in the present invention will be described below. Two implementations, respectively utilizing (1) gate lines and source lines (2) gate lines and X independent sensing lines to detect touch points, are provided below for illustrative purpose. It is noted that the present invention is not limited to the two implementations.

Figure 4A:
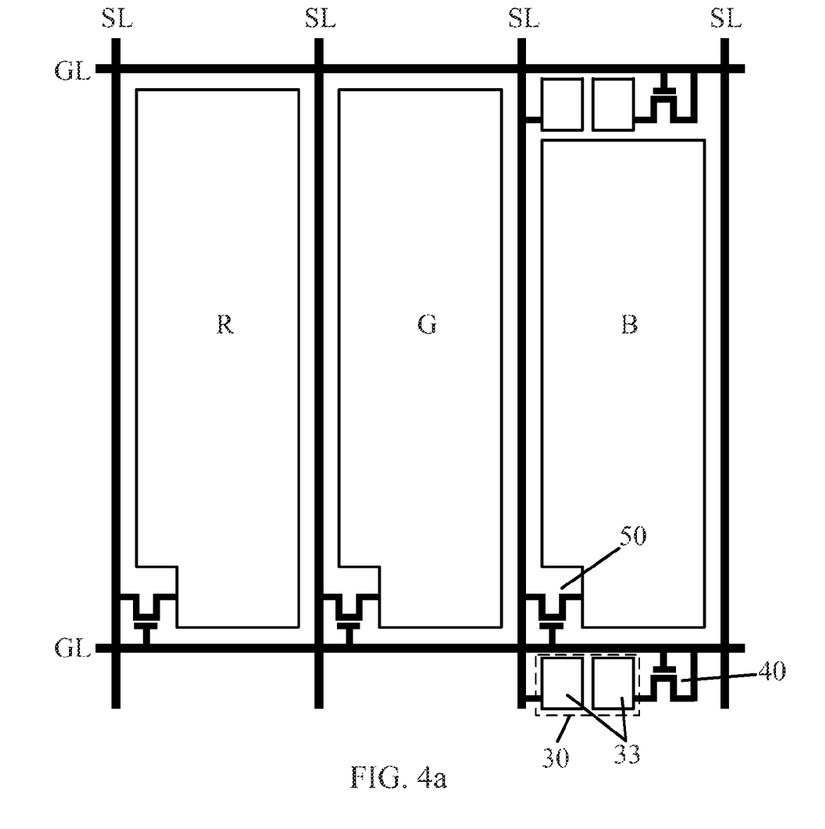
FIG. 4a is a diagram showing a layout of a touch sensing display device implemented according to the present invention.
Figure 4B:
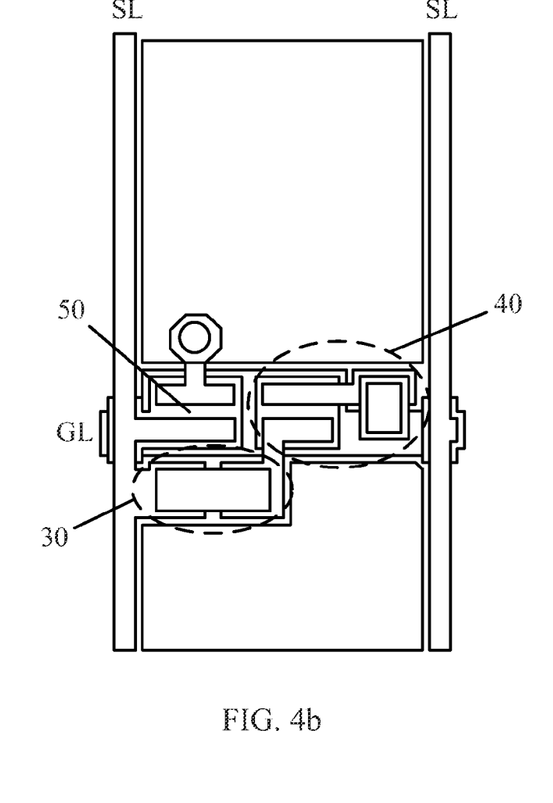

(1) Utilizing Gate Lines and Source Lines to Detect Touch Points:

Please refer to FIG. 4a and FIG. 4b. FIG. 4a is a diagram showing a layout of a touch sensing display device implemented according to the present invention. FIG. 4b shows a top view of the components in the touch sensing display device in FIG. 4a. Generally, a display panel has a plurality of pixel areas divided by a plurality of interlaced gate lines (GL) and source lines (SL). Each pixel area includes at least red (R), green (G), and blue (B) sub-pixel areas. Each sub-pixel area (R, or G, or B) corresponds to a thin-film transistor 50. The thin-film transistor 50 is served as a switch for controlling to input pixel data. It is noted that FIG. 4a shows an example in which one touch switch 30 and one switch element 40 are disposed in correspondence to one pixel area. In practice, there are lots of touch switches 30 and switch elements 40 distributed over the display panel. In addition, one touch switch 30 and one switch element 40 may correspond to two or more than two pixel areas.

As shown in FIG. 4a and FIG. 4b, the touch switch 30 and the switch element 40 are connected between the gate line (GL) and source line (SL) in series for controlling the electrical connection of the gate line (GL) and source line (SL). The touch switch 30 and the switch element 40 are connected to one gate line (GL) and one source line (SL) for one pixel area (or more than one pixel area). As shown in FIG. 4a, the gate line (GL), switch element 40, touch switch 30, and source line (SL) are connected in sequence. More specifically, the touch switch 30 has two metal pads 33. The two metal pads 33 are respectively connected to the source line (SL) and the drain (or source) of the MOS diode. The gate and source (or drain) of the MOS diode are connected together, and also connected to the gate line (GL). The conductive layer 36 of the spacer 35 shown in FIG. 3 is able to turn the touch switch 30 on. The structure and connection as to the touch switch 30 and switch element 40 are also illustrated in FIG. 3.

Figure 5:
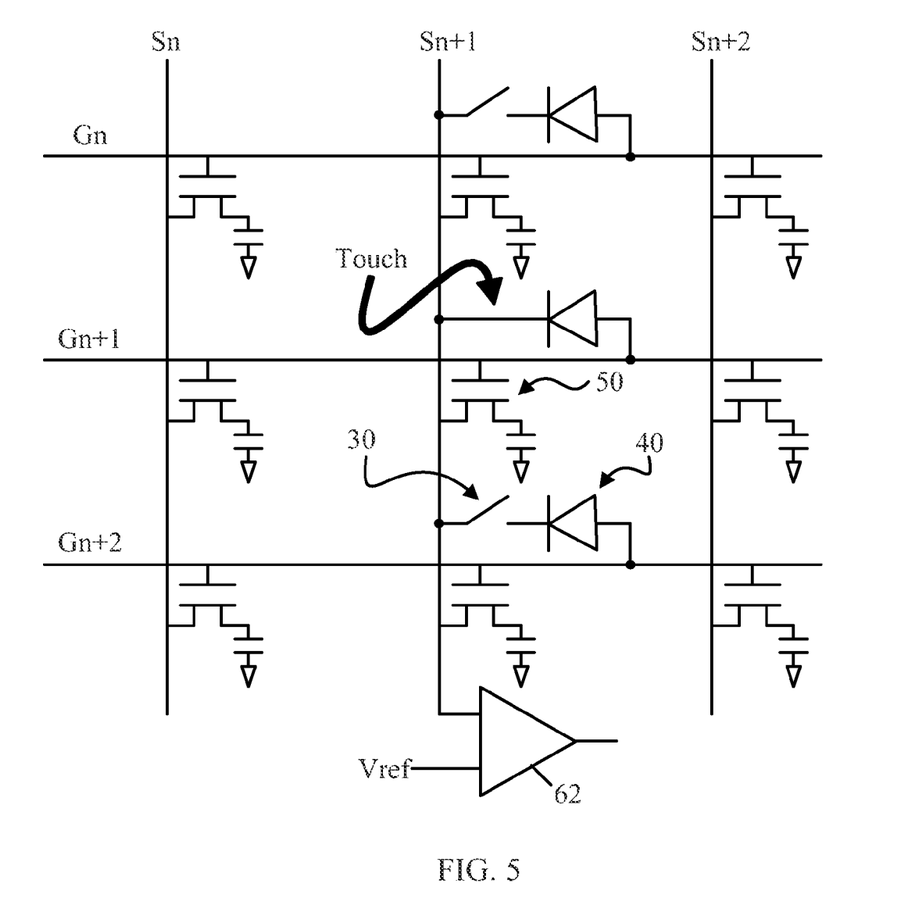
FIG. 5 is a diagram illustrating the operation principle to determine a position of touch point for the touch sensing display device in FIG. 4a implemented according to the present invention.
Figure 6A:
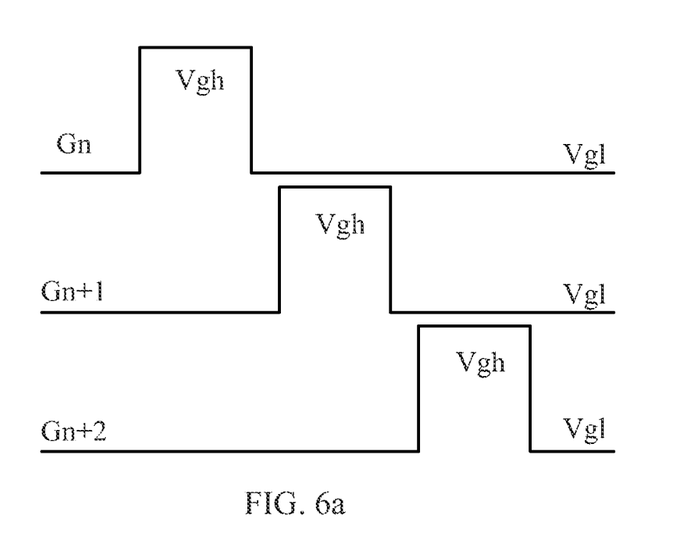
FIG. 6a is a diagram showing a timing chart of scan signals on the gate lines (GL) in FIG. 5.
Figure 6B:
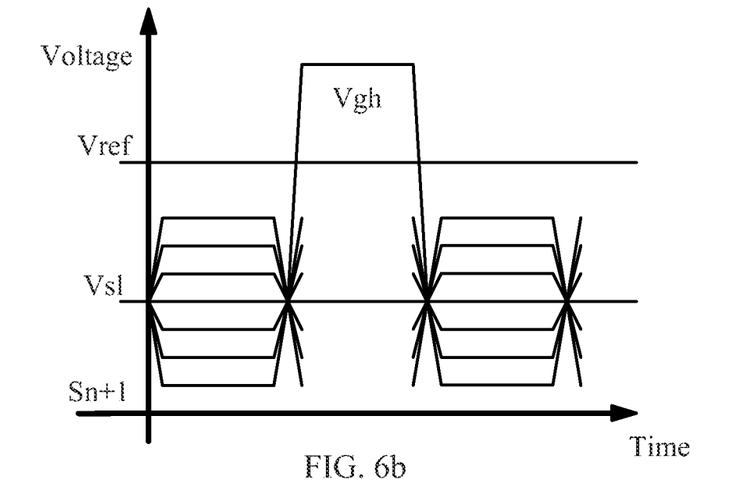
FIG. 6b is a diagram showing the relationship between voltage and time for a Sn+1 source line in FIG. 5.
Figure 6C:
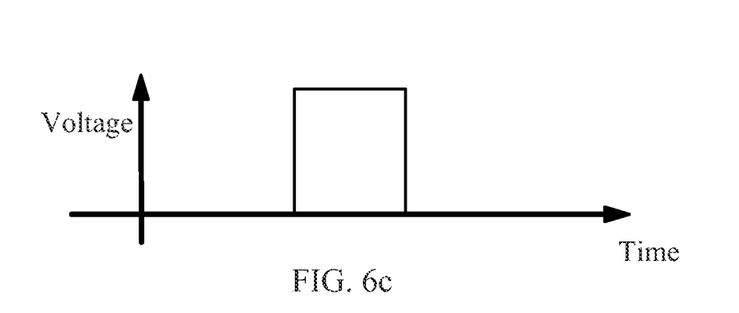
FIG. 6c is a diagram showing a comparison result outputted from a voltage comparator in FIG. 5.

Please refer to FIG. 5, FIG. 6a, FIG. 6b, and FIG. 6c. FIG. 5 is a diagram illustrating the operation principle to determine a position of touch point for the touch sensing display device implemented according to the present invention. FIG. 6a is a diagram showing a timing chart of scan signals on the gate lines (GL). FIG. 6b is a diagram showing the relation between voltage and time for a Sn+1 source line. FIG. 6c is a diagram showing a comparison result outputted from a voltage comparator. As shown in FIG. 5 and FIG. 6a, scan signals are transmitted to the gate lines (GL). When a scan signal applied to a gate line (GL) is on a high-level voltage (Vgh), the thin-film transistor 50 will be turned on. At this moment, pixel data will be transmitted to the pixel area corresponding to the gate line (GL) by the corresponding source line (SL). Therefore, the digital data of images is updated. When the gate line (GL) is scanned, the high-level voltage of the scan signal also turns on the switch element 40. Otherwise, when the gate line (GL) is not scanned and the scan signal is at a low-level voltage, the switch element 40 is turned off. In addition, when receiving a touch event, the touch switch 30 is turned on. When the panel is touched by a user at a position, i.e. a touch point, the touch switch 30 corresponding to the touch point is turned on. When the touch point is scanned, the switch element 40 corresponding to the touch point is also turned on. At this moment, the corresponding gate line (GL) and source line (SL) are electrically connected, and the high-level voltage of the scan signal on the corresponding gate line (GL) is superimposed to the corresponding source line (SL). The source line (SL) corresponding to the position of touch point is thereby varied in voltage.

As shown in FIG. 5, FIG. 6a, FIG. 6b, and FIG. 6c, when a touch event occurs at a position where a Gn+1 gate line and a Sn+1 source line are interlaced, and the Gn+1 gate line happened to be scanned, the touch switch 30 and switch element 40 corresponding to the position are turned on. At this moment, the high-level voltage of the scan signal on the Gn+1 gate line is superimposed to the Sn+1 source line. The voltage of the Sn+1 source line is thereby raised. Moreover, the source lines (SL) on the display panel are connected to an end of a voltage comparator 62. Another end of the voltage comparator 62 is inputted with a reference voltage (Vref). The voltage comparator 62 compares the voltage (Vs1) of a source line (SL) and the reference voltage (Vref), and then outputs a comparison result. When the voltage (Vs1) of the source line (SL) is greater than the reference voltage (Vref), the comparator 62 determines that a touch event has occurred at the position where the source line (SL) is located. As shown in FIG. 6b, the voltage (Vs1) of the Sn+1 source line is greater than the reference voltage (Vref). Therefore, the voltage comparator 62 outputs a comparison result with a high-level voltage as shown in FIG. 6b. The high-level voltage of the comparison result represents that a touch event has occurred at the Sn+1 source line. The X position of the touch point can be directly obtained according to the position where the Sn+1 source line is located on the display panel. When the touch point is determined by the voltage comparator 62, the touch point happened to be scanned. Therefore, the Y position of the touch point can be obtained by resolving or analyzing the timing of the scan signal on the gate line (GL). A two-dimensional coordinate (X, Y) of the touch point on the display panel are thereby obtained.

In this implementation, it is necessary to dispose only the current switches triggered by scan signals and the mechanical switches in the pixel areas of the display panel for detecting touch events. The original gate lines and source lines in the panel are utilized for determining the coordinate of touch point. There is no need to dispose other sensing lines. Therefore, the manufacturing cost is reduced. In addition, this implementation will not lead to the problem of increasing parasitic capacitances, and thereby image displaying is maintained stable. If additional sensing lines are disposed, parasitic capacitances may reside between the sensing lines and the gate lines or between the sensing lines and the source lines. The parasitic capacitances due to the additional sensing lines may interfere with the gate lines and source lines.

In this implementation, the switch elements disposed between the gate lines and source lines are served as current switches. When the gate lines are not scanned, the corresponding switch elements are turned off. Therefore, since the corresponding switch elements are turned off, the voltage of the corresponding source lines will not be affected even though touch events occur thereon. Therefore, images on the screen can be updated normally. When the panel is touched by a user, an area including many touch points is touched actually. If the switch elements are not disposed in the panel, these touch points will affect the voltage of the source lines at the same time so that images on the screen may be disturbed and may not be updated well.

Figure 7A:
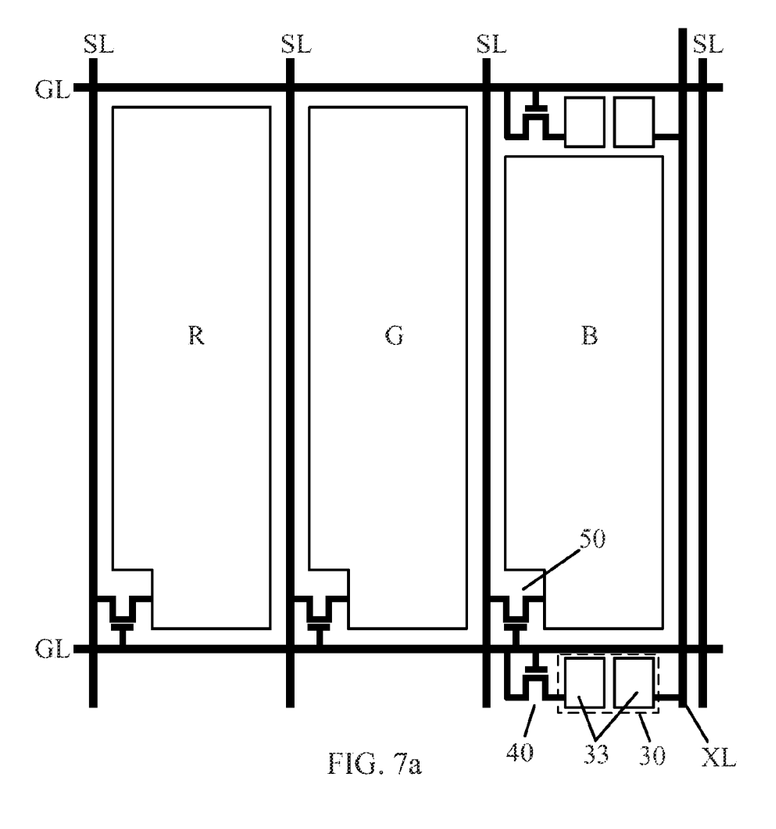
FIG. 7a is a diagram showing a layout of another touch sensing display device implemented according to the present invention.
Figure 7B:
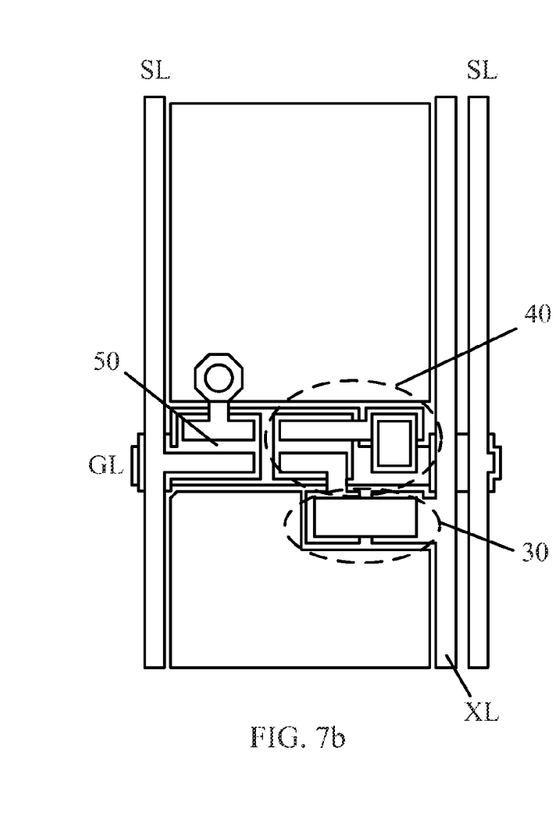

(2) Utilizing Gate Lines and X-Sensing Lines to Detect Touch Points:

The difference between this implementation and the previous implementation is that additional sensing lines are disposed in the panel for this implementation. As shown in FIG. 7a and FIG. 7b, the touch switch 30 and switch element 40 are connected between the gate line (GL) and an X independent sensing line (XL) in series. More specifically, the touch switch 30 has two metal pads 33. The two metal pads 33 are respectively connected to the X independent sensing line (XL) and the drain (or source) of MOS diode. The gate and source (or drain) of MOS diode are electrically connected.

Figure 8:
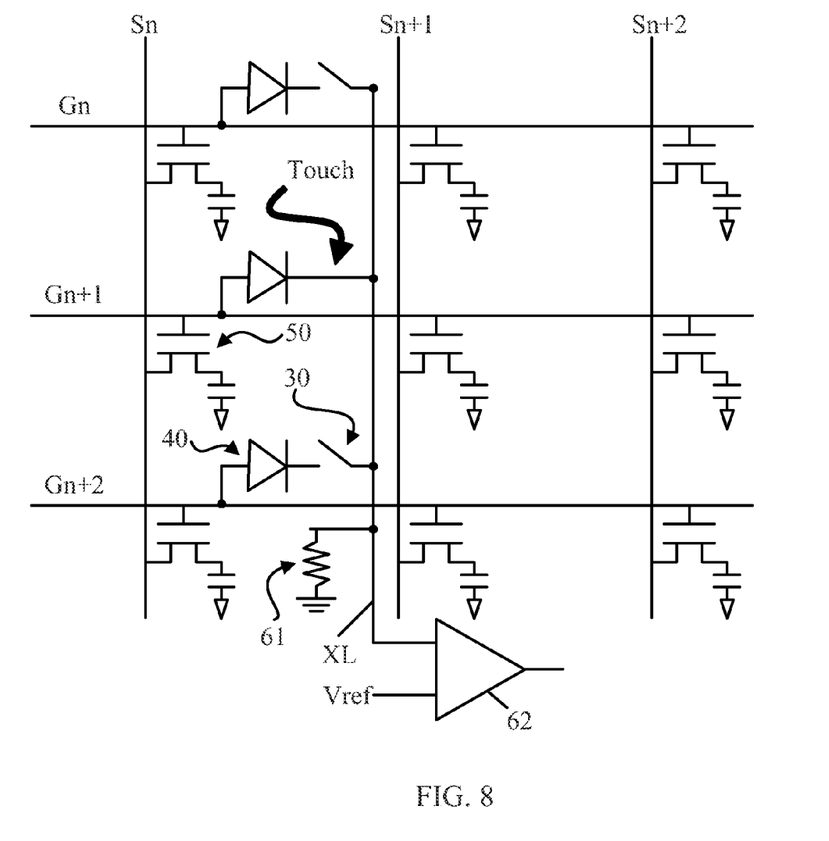
FIG. 8 is a diagram illustrating the operation principle to determine a position of touch point for the touch sensing display device in FIG. 7a implemented according to the present invention.

As shown in FIG. 8, the X independent sensing lines (XL) on the display panel are connected to a resistor 61. The X independent sensing lines (XL) are also connected to an end of a voltage comparator 62. Another end of the voltage comparator 62 is inputted with a reference voltage (Vref). The voltage comparator 62 compares the voltage of the X independent sensing line (XL) and the reference voltage (Vref), and then outputs a comparison result.

Figure 9A:
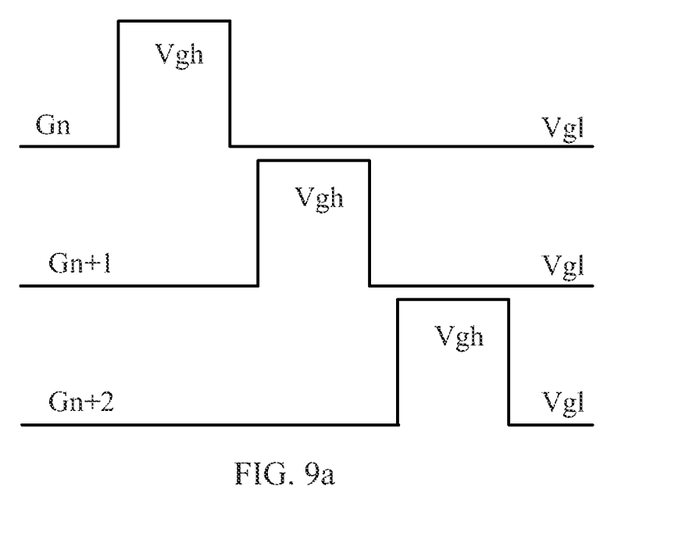
FIG. 9a is a diagram showing a timing chart of scan signals on the gate lines (GL) in FIG. 8.
Figure 9B:
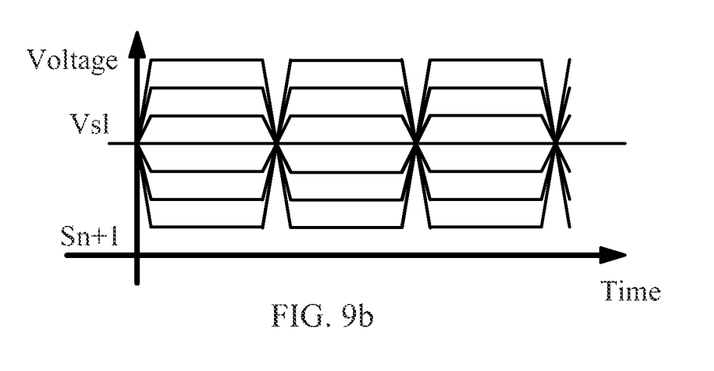
FIG. 9b is a diagram showing the relation between voltage and time for a Sn+1 source line in FIG. 8.
Figure 9C:
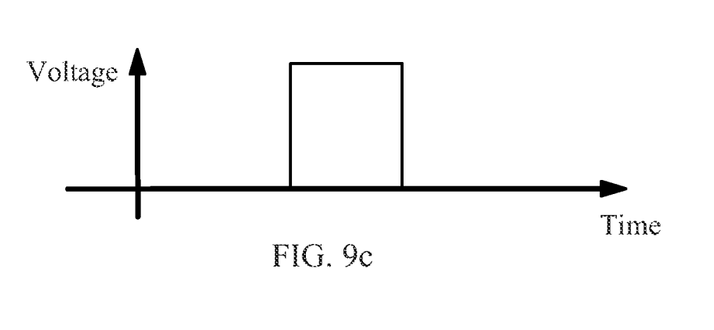
FIG. 9c is a diagram showing a comparison result outputted from the voltage comparator in FIG. 8.

FIG. 9a is a diagram showing a timing chart of scan signals on the gate lines (GL). FIG. 9b is a diagram showing the relation between voltage and time for a Sn+1 source line. FIG. 9c is a diagram showing a comparison result outputted from the voltage comparator 62. In this implementation, the gate line (GL), switch element 40, touch switch 30, and X independent sensing line (XL) are connected in sequence. When the touch switch 30 and switch element 40 are turned on, a high-level voltage of the scan signal on the corresponding gate line (GL) is superimposed to the corresponding X independent sensing line (XL). The voltage (Vs1) of the source line (SL) will not be affected by a voltage variation of the X independent sensing line (XL). As shown in FIG. 9b, the voltage of a Sn+1 source line will not be affected by the X independent sensing line (XL).

In this implementation, X independent sensing lines are parallel to source lines. The voltage of source lines will not be affected by the high-level voltage of scan signals on the gate lines. Therefore, pixel data transmitted by the source lines will not be affected. In addition, the X independent sensing lines may increase the accuracy of the position determination operated by the voltage comparator.

The present invention is not limited to the two above-mentioned implementations. The present invention may also be implemented as (3) utilizing source lines and additional independent scanning lines parallel to gate lines, and (4) utilizing additional independent scanning lines and additional independent sensing lines interlaced each other to detect a touch point. In case (3), the touch switch 30 and switch element 40 are connected between a source line and an independent scanning line in series. In case (4), the touch switch 30 and switch element 40 are connected in series between an independent scanning line and an independent sensing line. The above-mentioned additional independent scanning lines can be connected to a gate driving circuit originally disposed on the display panel, or to an additional gate driving circuit for driving or transmitting the scan signals.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A touch sensing display device comprising:
   a first substrate;
   a second substrate parallel to the first substrate, a plurality of scanning lines and a plurality of sensing lines being disposed on the second substrate, and the scanning lines being interlaced with the sensing lines;
   a plurality of touch switches disposed on the second substrate, each touch switch being connected between one of the scanning lines and one of the sensing lines in series;
   a plurality of switch elements, wherein each switch element is connected with one of the touch switches, and the switch element and the touch switch are connected between each scanning line and each sensing line in series, each switch element operates according to a scan signal, and said switch element is turned on when receiving the scan signal; and
   a plurality of spacers disposed on the first substrate corresponding to the touch switches, respectively, each spacer having a conductive layer disposed on a bottom side facing to the corresponding touch switch, and having isolating surfaces on the other sides;
   wherein each touch switch has a turned-on state and a turned-off state, and the conductive layer of the spacer corresponding thereto causes said touch switch to be changed from the turned-off state to the turned-on state when a touch event is received; and
   wherein each switch element comprises a metal oxide semiconductor (MOS) diode, which is a metal oxide semiconductor field effect transistors (MOSFET) having a gate thereof connected to a source or to a drain thereof.

2. The touch sensing display device of claim 1, wherein when said touch switch receives the touch event and said switch element receives the scan signal, said touch switch and said switch element are turned on so that said scanning line and said sensing line connected to said touch switch and said switch element are electrically connected, and a voltage of the scan signal on said scanning line is superimposed to said sensing line.

3. The touch sensing display device of claim 2, wherein a two-dimensional coordinate of a position where the touch event occurs at is obtained by analyzing a timing of the scan signal and detecting a voltage variation on said sensing line.

4. The touch sensing display device of claim 2, further comprising a voltage comparator connected to said sensing lines, utilized for comparing a voltage of each sensing line and a reference voltage for determining whether the touch event occurs.

5. The touch sensing display device of claim 1, wherein each touch switch has two separate metal pads, and said touch switch is turned on when the conductive layer contacts the two metal pads.

6. The touch sensing display device of claim 1, wherein the scanning lines are gate lines for transmitting scan signals to control thin-film transistors, and the sensing lines are source lines for transmitting pixel data.

7. The touch sensing display device of claim 1, wherein the scanning lines are gate lines for transmitting scan signals to control thin-film transistors, and the sensing lines are parallel to source lines for transmitting pixel data.

8. The touch sensing display device of claim 1, wherein the scanning lines are parallel to gate lines for transmitting scan signals to control thin-film transistors, and the sensing lines are source lines for transmitting pixel data.

9. The touch sensing display device of claim 1, wherein the scanning lines are parallel to gate lines for transmitting scan signals to control thin-film transistors, and the sensing lines are parallel to source lines for transmitting pixel data.

* * * * *